United States Patent

[11] 3,533,365

[72] Inventors Richard Tanner;
  Theodor Jacobovici; Fritz Wuthrich,
  Zurich, Switzerland
[21] Appl. No. 760,031
[22] Filed Sept. 16, 1968
[45] Patented Oct. 13, 1970
[73] Assignee Von Roll AG
  Gerlafingen, Switzerland
  a corporation of Switzerland
[32] Priority April 26, 1968
[33] Switzerland
[31] 6,267/68

[54] METHOD AND COMBINED FURNACE FOR THE SIMULTANEOUS INCINERATION OF REFUSE OR GARBAGE AND SEWAGE SLUDGE
2 Claims, 1 Drawing Fig.

[52] U.S. Cl. ................................................... 110/15
[51] Int. Cl. ..................................................... F23g 5/04
[50] Field of Search ......................................... 110/7, 8, 12, 15, 18

[56] References Cited
UNITED STATES PATENTS

| | | | |
|---|---|---|---|
| 1,450,127 | 3/1923 | Witz | 110/7 |
| 1,659,564 | 2/1928 | Duncan | 110/15 |
| 2,269,273 | 1/1942 | Krogh et al. | 110/15X |
| 2,879,726 | 3/1959 | Ferriss et al. | 110/7 |

Primary Examiner—Kenneth W. Sprague
Attorney—Werner W. Kleeman

ABSTRACT: A combined furnace is disclosed for simultaneously incinerating refuse or garbage and sewage sludge, the furnace incorporating two distinct combustion chambers in direct and open connection having mechanical grates therein of adequate design and position to suit the specific requirements for both the refuse and sludge and to allow the final phase of incineration to be completed in common. The furnace further includes means for the common discharge of both the gaseous products and the residues of incineration. A novel method for operating said furnace is also disclosed.

Patented Oct. 13, 1970
3,533,365
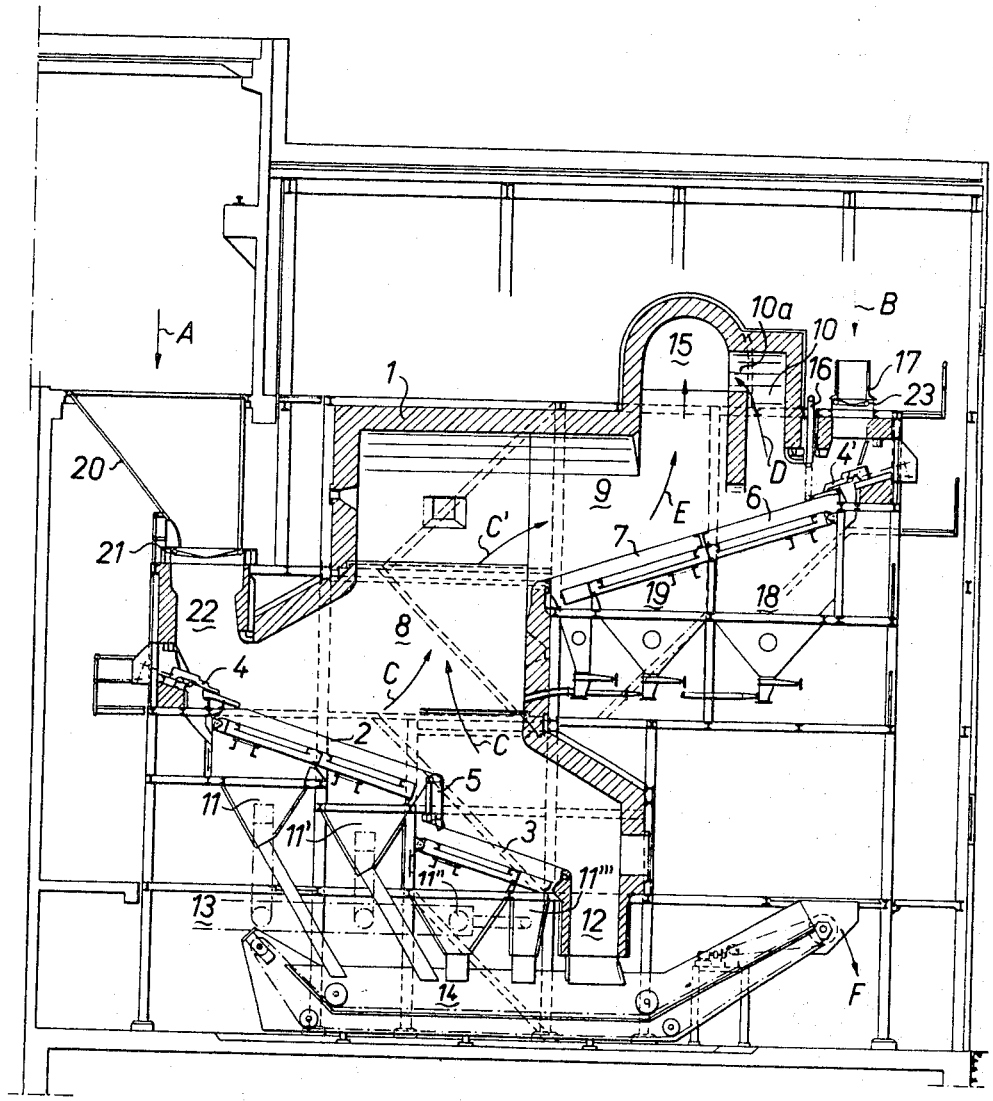
INVENTORS
RICHARD TANNER, THEODOR
JACOBOVICI & FRITZ WUTHRICH
BY Jacobi & Davidson
ATTORNEYS

METHOD AND COMBINED FURNACE FOR THE SIMULTANEOUS INCINERATION OF REFUSE OR GARBAGE AND SEWAGE SLUDGE

BACKGROUND OF THE INVENTION

This invention generally relates to furnaces, both for the incineration of refuse as well as sewage sludge.

For the incineration of household, municipal and/or industrial refuse, furnaces of various designs have been developed and are available in a wide range of sizes to serve the requirements of smaller municipalities as well as those of the biggest towns. Generally speaking, these furnaces are fitted with grates of various conceptions and designs, the function thereof being well known as disclosed in Swiss Pat. No. 375,824, and as discussed below.

Unlike the incineration of refuse, which is carried out in all furnaces in accordance with the same process and rules as tested in many years of practice, the incineration of sewage sludge which results from waste water treatment is carried out by many previously proposed processes, some of these processes already having been realized at different scales.

As is well known, sewage sludge occurring in waste water clearing plants is an aqueous suspension containing no more than 5—8 percent solids. By various processes, which may be mechanical, thermal and/or chemical, the sludge is partially dewatered and changed into sludgecakes with 40—50 percent water content in the case of some processes and up to 70 percent in the case of other ones. To incinerate these sludgecakes so as to completely destroy the putrescible and malodorant organic matter therein contained, is a problem quite different from the incineration of refuse, as defined above.

Attempts have been made and are still being made to burn refuse and sludge together, but only with partial success. The addition of sludgecakes to the refuse, two matters quite different in constitution, raises the difficult problem of their homogenous mixture, and furthermore, and particularly for cakes of high water content, their admissible proportion is much reduced. These conditions are not easy to comply with continuously on operational scale, and nonobservance thereof may hinder and even bring to failure the incineration of the refuse itself which is the primary object of the plant.

Thus, it has been found preferable to burn the sludgecakes separately, for which various processes again have been and are being developed, and furnaces therefor designed and tested, one of these being described in the Swiss Pat. No. 417,833, to which reference will be made herein.

It is a primary object of the subject invention to provide a furnace which is capable of simultaneously incinerating both refuse and sewage sludge but in a manner avoiding the drawbacks of the prior art, and at a low cost.

Other objects and advantages are also implemented by the subject invention which relates to the incorporation within a single furnace of a first incineration station for refuse and of a second and distinct station for sludgecakes, both stations being in such a position to each other, so as to ensure simultaneous operation. The relative sizes, *i.e.* capacities, of these two stations are chosen according to local conditions, taking into consideration the relative amounts of refuse and sludgecakes to be dealt with, or the respective drainage areas.

BRIEF DESCRIPTION OF THE DRAWING

The invention itself as well as additional advantageous features and details thereof will become readily apparent when consideration is given the following description of the preferred embodiment thereof. Such description refers to the appended drawing wherein the single figure thereof is a simplified, longitudinal section of the inventive furnace.

DETAILED DESCRIPTION OF A PREFERRED EMBODIMENT

An embodiment of the furnace constructed according to the invention, is shown by way of example in the accompanying drawing, and in relation to this embodiment, the method of the invention will also be described. The single drawing, as discussed above, is a simplified longitudinal section of a combined furnace for refuse and sewage sludge, wherein, for the sake of illustrative clarity, most minor constructional details have been omitted.

In the furnace 1, there is provided an incinerating station for refuse, comprising, in a combustion chamber 8, grates 2 and 3 in stepped succession, with a dropwall 5 therebetween and with a feeding device 4 ahead of grate 2. Furthermore, the furnace incorporates an incinerating station for sludgecakes, comprising interconnected predrying and combustion grates 6 and 7. with a feeding device 4' similar to that for refuse. The grates 2, 3, 6 and 7 are of the inclined, mechanically driven type. By the propulsory action of the grates and under the effect of gravity, the fuel beds (refuse or sludgecakes) are caused to travel along the slope of the grates.

Refuse is charged at "A" into a hopper 20 by means of a grabcrane and, after passing through a remote controlled flaplock 21, falls into a pit 22 to form therein a plug for the airtight occlusion of the combustion chamber. By means of the feeding device 4, the refuse is gradually pushed on the grate 2, where it is predried and ignited in the usual manner and thereupon drops at 5 on the grate 3, where combustion is completed, as is well known and described in detail in Swiss Pat. No. 375,824. The grates 2 and 3 are subdivided into zones with separate supplies of underblast from chambers 11, 11', 11" and 11''', the combustion air being supplied through duct 13 by a fan not illustrated in the drawing. The residues from combustion, the so-called clinker, fall through the pit 12 into a conveyor 14, for discharge as illustrated by the arrow. This conveyor comprises an endless chain mechanism, running in a watertrough, the water ensuring the airtight occlusion of the blast chambers 11 and of the pit 12.

The combustion chamber 8 above the grates 2 and 3 is of the uncooled type. Due to this, the combustion gases flowing in the direction of the arrows "C" will carry all of the heat generated by the burning refuse, leaving the combustion chamber with temperatures of 900—1000°C.

The sludgecakes are charged at "B" into a receiver 17 with closing flaps 23 and are thereupon pushed by a feeding device 4' on a predrying grate 6. A vertically sliding damper 16 is provided for controlling the thickness of the sludge layer on the grate 6 and for airtight sealing. Hot air from the chamber 18 or recirculated hot combustion gases from the refuse-burning compartment are supplied under pressure below the grate 6 to act as drying agent for the still moist sludgecakes. By this, the water content of the sludge cakes is reduced to about 20 percent and a mixture of cooled air or gases and water vapor will emanate above the grate 6, to flow through the chamber 10, as indicated by the arrows "D".

The predried sludgecakes are caused to travel on a combustion grate 7, where total drying, ignition and combustion take place successively in known manner with hot underblast being supplied below the grate 7 from chamber 19, also as described in detail in the Swiss Pat. No. 417,833. The resulting combustion gases flow in the direction of the arrows "E" in the combustion chamber 9 and mingle with the combustion gases effluent from the combustion chamber 8 along the arrows "C". The residues of sludgeburning, consisting of the noncombustible matter therein contained, will drop from the discharge end of the grate 7 on the grate 3 to mingle with the clinker resulting from refuse burning and to follow the common path to pit 12 and conveyor 14, as described above. The mixture of cooled air or gases and water vapor from chamber 10 is furthermore added to the comingled combustion gases from refuse and sludge in the chamber 9. Under the effect of a draught fan (not represented), the total gas stream flow through the flue duct 15 to be cleaned and expelled into the atmosphere in the usual way.

As illustrated in the accompanying drawing, it should be particularly noted that, in accordance with the invention, the two distinct incinerating stations for refuse and sludge within the combustion furnace have their respective grates 2—3 and 6—7 arranged with opposed slopes and at different levels, with the discharge end of the combustion grate 7 for sludge placed approximately above the center of the combustion grate 3 for refuse. Furthermore, it should be noted that the combustion chambers 8 for refuse and 9 for sludge are in direct and open connection. These features of the invention ensure important functional advantages, as will be discussed.

As is well known, sewage sludge, even when completely dry, is a very peculiar fuel of not only low calorific value, but also difficult to ignite and to burnout. This is due to the fact that the organic, combustible particles contained therein, are practically submerged in at least an equal amount of particulate, mineral and therefore noncombustible matter which constitutes a great hindrance not only to the propagation of heat and ignition but also to the access of combustion air. By causing the very hot gases issuing from the combustion chamber 8 to come into contact during their passage through the combustion chamber 9 with the layer on the combustion grate 7 consisting of already dry sludge, ignition and burning of this sludge is assisted and promoted under the effect of heat transmitted from these gases. By this action, and by the addition of the cooler combustion gases from sludge and of the still cooler gaseous mixture from chamber 10, the temperature of the effluent gas stream at 15 is very much reduced. This is a functional advantage, since it permits the further treatment of the effluent gases without recourse to an additional cold agent, such as water spray or cooling air.

The difficulties encountered with sludge combustion, as already mentioned, are increased in the final stage of combustion, when the proportion of combustible parts in the sludge is very low, said parts being literally wrapped in mineral matter, and besides this may be partially sintered. From this point of view, the arrangement of the discharge end of the grate 7 approximately above the center of the combustion grate 3 is of great importance. In fact, sludge which, for the reasons above or for any other reasons, has not been completely burntout on the grate 7, will drop on grate 3 amidst a very intensive fire at high temperature, there to complete its combustion. The pronounced height of drop is a further promoting factor, since possible lumps of sludge will thereby be dislocated and the combustible parts therein rendered free for combustion.

From still another point of view, it should be noted that the combined furnace for refuse and sludge according to the invention, is a very compact unit requiring less space and less surrounding building work, thereby reducing the initial cost of the incinerating plant.

As should now be apparent, the objects set forth at the outset of this specification have now been successfully achieved.

We claim:

1. A combustion furnace for the simultaneous incineration of refuse and sewage sludge, said furnace comprising; two distinct combustion chambers, each combustion chamber respectively defining a separate incinerating station for refuse and for sewage sludge, each incinerating station comprising mechanical predrying grates and combustion grates, each of the grates being subdivided into zones, means for controllably supplying gaseous blast to each said zone, said grates being inclined and in continuation and being arranged with those grates of one incinerating station being of opposite inclination and at different levels than the grates of the other incinerating station, a discharge end of said combustion grate for the sewage sludge being disposed vertically above and approximately centrally of the combustion grate for the refuse, said incinerating station for the sewage sludge comprising means for controlling the thickness of the layer on said predrying grate for the sewage sludge and further comprising a separate chamber disposed above said predrying grate, said seperate chamber being connected to said combustion chamber for the sewage sludge by an outlet opening for the gaseous products resulting from the predrying of the sewage sludge, a partition wall separating said combustion chamber for the sewage sludge from said separate chamber, said outlet opening extending through said partition wall, said two combustion chambers for the refuse and for the sewage sludge being in direct and open connection with respect to one another and being disposed such that the gas stream emanating from said combustion chamber for the refuse flows through said combustion chamber for the sewage sludge along said combustion grate therein, said combustion chamber for the sewage sludge defining a means for comingling said gaseous products from predrying of the sewage sludge with both streams of combustion gases from refuse and sewage sludge burning, a common outlet duct for the total gas stream, and common means for the simultaneous discharge of the residues of combustion from both the refuse and the sewage sludge, said discharge means being disposed back of the discharging end of said combustion grate for the refuse.

2. A method of simultaneously incinerating refuse and sewage sludge wherein the refuse and sludge are incinerated at respective incinerating stations disposed in two distinct combustion chambers in direct and open communication with one another, each chamber having mechanical grate means therein subdivided into zones for predrying and for combustion, said method comprising the steps of:

a. predrying and subsequently combusting both the refuse and the sewage sludge on the zoned mechanical grate means in two respectively separate locations, each location directly communicating with one another;

b. controllably supplying combustion gasses to the different predrying and combustion zones of the grate means for the refuse and the sewage sludge;

c. passing a gas stream from the combustion of the refuse in contact with and along a layer of the predried sewage sludge;

d. comingling the gaseous products of predrying of the sewage sludge with a stream of combustion gasses from refuse and sewage burning;

e. discharging the residues of combustion from sewage sludge onto the combustion grate for the refuse amidst an intensive fire at high temperature to complete the combustion of the sewage residues;

f. simultaneously discharging from the furnace the solid residues of the combustion of both the refuse and the sludge; and g. removing the total gas stream resulting from said comingling of said different gas streams.